(No Model.) 2 Sheets—Sheet 1.
E. A. RAATHS.
SULKY PLOW.
No. 410,022. Patented Aug. 27, 1889.
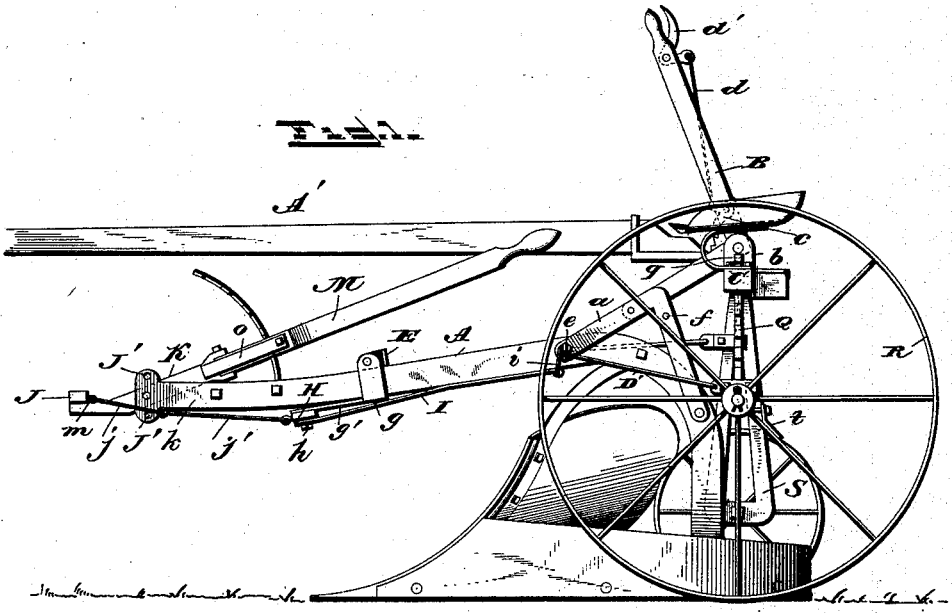
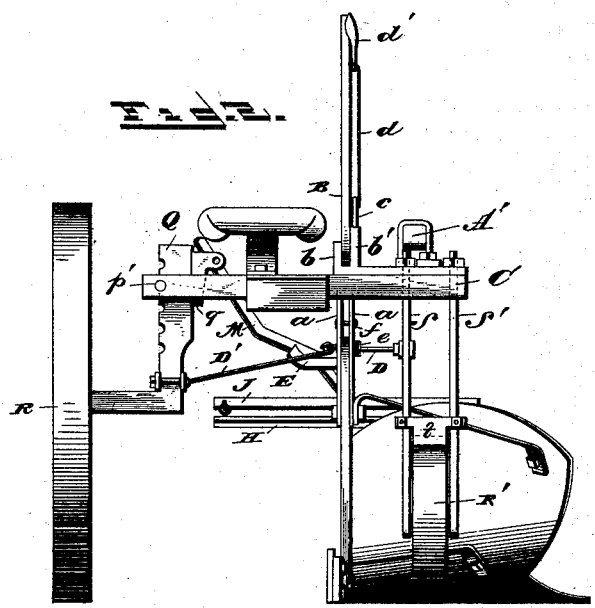
Witnesses
G. S. Elliott
E. W. Johnson
Emil A. Raaths.
Inventor
By his Attorneys (No Model.) 2 Sheets—Sheet 2.
E. A. RAATHS.
SULKY PLOW.
No. 410,022. Patented Aug. 27, 1889.
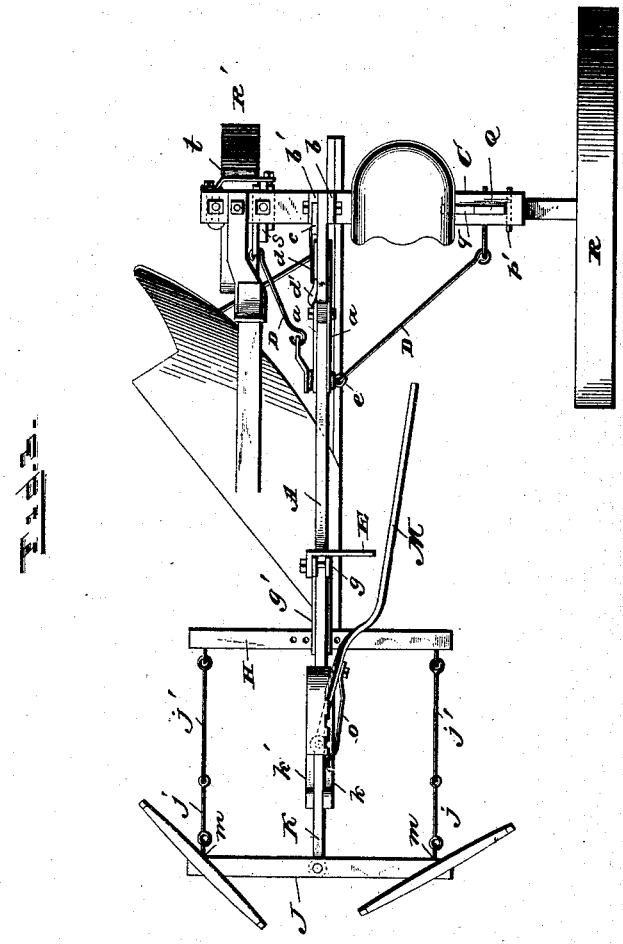
Witnesses
G. S. Elliott
E. W. Johnson
Emil A. Raaths.
Inventor
By his Attorneys

UNITED STATES PATENT OFFICE.

EMIL A. RAATHS, OF PLIER, WISCONSIN.

SULKY-PLOW.

SPECIFICATION forming part of Letters Patent No. 410,022, dated August 27, 1889.

Application filed May 16, 1889. Serial No. 310,949. (No model.)

*To all whom it may concern:*

Be it known that I, EMIL A. RAATHS, a citizen of the United States of America, residing at Plier, in the county of Shawano and State of Wisconsin, have invented certain new and useful Improvements in Sulky or Riding Plows; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to certain new and useful improvements in riding-plows; and it consists in the construction and combination of the parts, as will be hereinafter set forth, whereby the supporting-wheels are pivoted to the plow-beam, so that the plow will not be affected by unevenness of the ground, the plow-beam being connected to the wheel-carrying frame by a bell-crank lever, so that the wheel-carrying frame and plow can be adjusted with respect to each other and the plow caused to enter the ground to the desired depth.

The invention also consists in the novel means employed for connecting the draft mechanism to the beam, whereby an evener is provided which can be raised or lowered to change the line of draft.

In the accompanying drawings, Figure 1 is a side view of a riding or sulky plow constructed in accordance with my invention. Fig. 2 is a rear view. Fig. 3 is a plan view.

A refers to the plow-beam, which is curved downwardly at its rear end, the landside of the plow being attached to this beam in the usual manner. From the beam A a brace extends forwardly and downwardly, the lower end thereof being attached to the front portion of the mold-board. The plow is further braced by cross-bars, which extend from the inner side of the landside to the inner side of the mold-board, the braces referred to being fully shown.

To the rear upper portion of the plow-beam, on each side thereof, are bolted angle-irons $a$ $a$, and between the forward members, near the upper ends thereof, is bolted a bell-crank lever B, said lever at the angle thereof being pivoted between supports $b$ $b'$, attached to the cross-bar C, to which the wheels are secured. The support $b'$ is extended and provided with ratchet-teeth, with which a pawl $c$, carried by the lever, engages, said pawl being connected by a bar $d$ to the angular handle $d'$, pivoted to the upper end of the lever. By means of the bell-crank lever B the rear end of the plow can be raised and lowered to enter the ground at the desired depth.

From the bolt $e$, which passes through eye-plates, there extend rearwardly rods or braces D D', which are connected to the vertical supports for the wheels, and the braces prevent the plow-beam swinging laterally, but permit the same to be raised and lowered. The angle-irons $a$ $a$ are connected to each other above the beam A by a bolt $f$, against which the lower end of the bell-crank lever will abut when the rear end of the plow is raised to its fullest extent.

E refers to the foot-rest, which is bolted to the plow-beam to be adjusted thereon, and this foot-rest is secured to a strap $g$, having upwardly-projecting side pieces, through which the bolt passes, and an extended tongue $g'$, perforated for the reception of a bolt $h$, to which the evener-bar or doubletree H is pivoted. The bolt $h$, which passes through the evener-bar, is supported at its lower end by a strap I, which extends rearwardly and is connected to a bail $i$, the ends of which are secured to the bolt $e$. The tongue $g'$ and strap I can have a slight vertical movement to adjust themselves in line with the doubletree J, to which they are connected by the linked bars $j$ $j'$. The evener-bar H is provided with a series of perforations, so that it can be adjusted laterally.

To the end of the beam are bolted side pieces $k$ $k'$, between which is secured a bar K, to the forward end of which is secured the doubletree J, having perforations to permit of lateral adjustment thereon, and the outer ends of the doubletree have openings $m$ $m$, through which pass links or connections, which extend from the evener-bar H to the forward links $j$.

The side piece $k'$ has formed thereon or attached thereto a curved or segmental rack-bar with which the lever M engages, the lower end of said lever being hinged to the upper or rear end of the bar K, so that it may be swung in and out of the depression in the segment for the purpose of adjusting vertically the doubletree. The lever M is provided with a spring o, which is rigidly attached thereto at one end by a bolt, the opposite end of said spring bearing upon the end of the bar K to hold the lever normally in contact with the notches, so that the draft mechanism can be adjusted.

The cross-bar C has attached thereto the driver's seat, beneath which is secured a tool-box of suitable construction. This cross-bar is provided at one end with a slot p, which is intersected at one end by a bolt p', with which the notched bar Q engages, said bar being adapted to be held in the notch by a key q. The lower end of this notched bar Q has an outwardly-extending portion at right angles therewith, and to the outer end thereof is secured the large supporting-wheel R. The opposite end of the cross-bar is provided with two perforations, through which pass and are secured the upper ends of depending bars S and S', and at the lower ends of these bars a small wheel R' is journaled, said wheel being located rear of the mold-board of the plow. A scraper t is bolted to these depending bars S and S' to keep the periphery of the wheel free from clods.

Both of the hand-levers are extended to be within reach of the driver, and by properly manipulating these levers the attendant while sitting upon his seat can either raise or lower the plow or change its position, so that it will enter the soil to the desired depth. The horses are connected by a suitable yoke-bar to the pole A', which is attached to the cross-beam C, while their traces are secured to the whiffletrees in the usual manner.

Having thus described my invention, what I claim as new, and desire to secure by Letters Patent, is—

1. The combination, in a riding or sulky plow, of a frame consisting of a cross-bar having a vertical slot near one end, a pin intersecting said slot, a vertical bar carrying a large wheel and playing in said slot and having a series of recesses at one edge to engage said pin, a removable key to maintain said engagement, and supports S and S', depending from the cross-bar near its other end and having a smaller wheel journaled therein, substantially as set forth.

2. The combination, in a riding or sulky plow, of a frame consisting of a cross-bar, a vertical bar connected therewith near one end and carrying a large wheel, and depending supports S and S', connected to the cross-bar near the other end and having a small wheel journaled therein, and a brace connecting said bars S and S' above the wheel and carrying a scraper therefor, substantially as set forth.

3. The combination, in a riding or sulky plow, of a supporting-frame mounted upon wheels, a plow-beam curved and pivotally connected at its rear and carrying a plow, as described, a rack-bar located at the front of said beam, and an inclined bar pivoted thereat and carrying a draft-evener, and a lever pivoted to said inclined bar to vary the position of the same and the draft-evener and provided with a spring to lock it in engagement with the rack, substantially as set forth.

In testimony whereof I affix my signature in presence of two witnesses.

EMIL A. RAATHS.

Witnesses:
WM. MICHELSTETTER,
S. H. RONDEAU.